United States Patent [19]

Earley

[11] Patent Number: 4,538,658

[45] Date of Patent: Sep. 3, 1985

[54] TIRE VALVE ASSEMBLY

[75] Inventor: John R. Earley, Lynchburg, Va.

[73] Assignee: Bridge Products, Inc., Northbrook, Ill.

[21] Appl. No.: 458,513

[22] Filed: Jan. 17, 1983

[51] Int. Cl.[3] ............................................. B60C 23/10
[52] U.S. Cl. ........................... 152/427; 152/DIG. 11; 137/234.5
[58] Field of Search .............. 137/223, 227, 228, 229, 137/234.5; 152/415, 427, 429, DIG. 11; 285/162

[56] References Cited

U.S. PATENT DOCUMENTS

| 2,128,623 | 8/1938  | Stuck   | 137/223   |
| 2,194,850 | 3/1940  | Goff    | 137/223   |
| 2,752,981 | 7/1956  | Vernon  | 152/429   |
| 2,772,714 | 12/1956 | Hosking | 137/223 X |
| 3,712,326 | 1/1973  | Thacker | 137/223   |
| 4,171,119 | 10/1979 | Lamson  | 137/223 X |

FOREIGN PATENT DOCUMENTS 771019  3/1957  United Kingdom ....... 152/DIG. 11

Primary Examiner—Harold W. Weakley
Attorney, Agent, or Firm—Welsh & Katz, Ltd.

[57] ABSTRACT

A tire valve assembly which is adapted to be mounted on the rim for a tubeless tire, and wherein the tire valve assembly is constructed of a non-metallic material. The tubeless tire valve assembly includes a valve stem which is constituted of a plastic material, for example, such as nylon or fiber-reinforced nylon, or a plastic material possessing similar physical properties, which has a flange integrally formed therewith at one end of the valve stem, and which is encompassed by a rubber grommet towards that stem end, and which is adhesively bonded to the valve stem and adapted to be sealingly mounted within an aperture formed in a tire rim for a tubeless tire.

7 Claims, 4 Drawing Figures

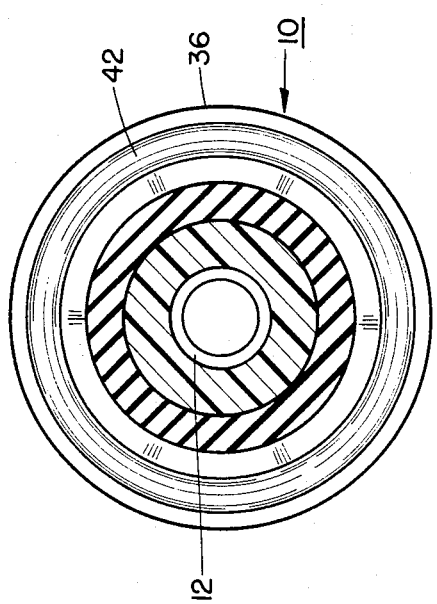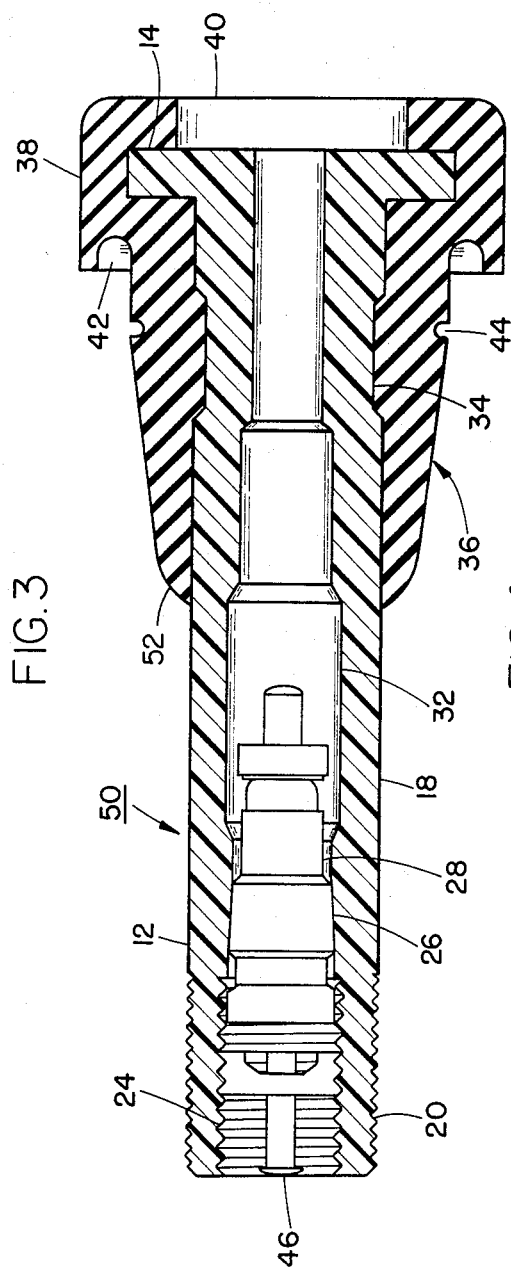

TIRE VALVE ASSEMBLY

BACKGROUND OF THE INVENTION

The present invention relates to tire valves, and more particularly, relates to a novel tubeless tire valve assembly of simple construction which is adapted to mounted on the rim of a tire, and wherein the tire valve assembly is constructed of a non-metallic material.

In the tire industry, particularly the segment relating to tubeless tires, it is currently the practice to provide tire valves which are adapted to be mounted on the rim for a tire, wherein the tire valve assembly includes a rubber grommet which is fitted over an elongate metallic valve stem, the latter of which is usually constituted of brass or similar metallic material, and in which the rubber grommet is either bonded to the valve stem or provides for an interference fit to thereby provide for a permanent connection or fastening between the valve assembly components. The grommet has an external configuration which adapts it to be sealing mounted in an aperture formed in a tire rim. Commonly, the valve stem is provided with an internally threaded bore portion to allow for insertion and threaded engagement with a suitable standard valve core structure, which is also constituted of metal, as is well known in the tire valve technology.

During the production of these tire valves, some problems have been encountered in attempting to provide for the satisfactory bonding of rubber grommets to metallic or brass valve stems in order to obtain a permanent fastening between these valve assembly components. Quite frequently, these problems are caused by the varying compositions of the brass components and of the rubber grommets, resulting in somewhat unpredictable physical characteristics which may adversely affect the degree of adhesion or bonding between the brass and rubber components. Consequently, at times it is possible that the pressure present within an inflated tire may cause the valve stem to be separated from the grommet, thereby leading to sudden deflation of the tire and possible road accidents to a vehicle employing such tire valve assemblies.

More recently, in lieu of adhesively bonding rubber grommets to brass valve stems in the construction of tire valves, particularly those for tubeless tires, valve assemblies have been developed in the industry wherein a metallic valve stem, preferably constituted of brass, has a rubber grommet mounted thereon with an interference or pressfit to provide for a permanent attachment or fastening between these components, and in which the valve stem is adapted to receive and mount a standard type of valve core. Among such valves which provide for a press-fitted engagement between a rubber grommet and a valve stem which is constituted of brass is U.S. Pat. No. 4,064,923, assigned to the Eaton Corporation, wherein the rubber grommet is mounted about a somewhat tapered portion of the brass valve stem in press-fitted relationship and is compressed at its ends between two flanges which are integrally formed with the valve stem. Although this tire valve arrangement is of a relatively simple two-piece construction, exclusive of the tire valve core, a tubeless tire valve arrangement of that type is rather expensive to manufacture due to the employment of brass for the valve stem, and moreover, does not always ensure that the rubber grommet will provide an adequate interference-fitted gripping engagement with the exterior surfaces of the valve stem.

More recently, tire valve constructions have been developed in the technology wherein the commonly employed metal or brass valve stem has been supplanted by a plastic material, for instance, nylon or glass fiber-reinforced nylon, with a rubber grommet being adhesively bonded to the valve stem.

Among such tire valve arrangements which are basically of a non-metallic construction is that disclosed in Lamson U.S. Pat. No. 4,171,119 wherein a valve stem of molded plastic material is assembled within a rubber grommet, and with the latter being adhesively bonded to the valve stem. In this instance, however, the valve stem is constituted of a plurality of molded parts which must then be assembled to provide for added physical support for an internal valve core and spring assembly and, although avoiding the use of brass or metal components, is of a rather complex, multi-component construction rendering the valve expensive to manufacture.

Thacker U.S. Pat. No. 3,712,326 discloses an inflation valve for tubeless tires wherein a valve stem which is constituted of a reinforced plastic material, such as glass fiber-reinforced nylon, is embedded within a rubber grommet and bonded thereto. Moreover, in order to provide for reinforcement in anchoring the valve stem within the grommet, the valve stem has an additional separate flange component molded thereto, and includes further molded sleeves in order to provide for the support of a valve core. Although this construction eliminates the utilization of metallic components, the structure of this tire valve is rather complex in nature and requires a plurality of molded components, thereby rendering the tire valve cumbersome and uneconomical.

SUMMARY OF THE INVENTION

Accordingly, in order to obviate the drawbacks and limitations encountered in the construction of the prior art tire valve assemblies, particularly for tubeless tires, wherein non-metallic tire valve structures are constituted of a multiplicity of components, and to also take advantage of the ruggedness inherent to metallic valve structures while avoiding the problems associated therewith, the present invention provides for a simple and novel tire valve assembly of non-metallic construction which is basically constituted of merely two components which are adhesively bonded together to form a unitary or integral tire valve assembly, and which is adapted to receive a standard valve core.

To this effect, the tubeless tire valve assembly pursuant to the present invention contemplates the provision of a valve stem which is constituted of a plastic material, for example, such as nylon or fiber-reinforced nylon, or a plastic material possessing similar physical properties, which has a flange integrally formed therewith at one end of the valve stem, and which is encompassed by a rubber grommet towards that stem end, and which is adhesively bonded to the valve stem and adapted to be sealingly mounted within an aperture formed in a tire rim for a tubeless tire. Formed at the distal end of the plastic valve stem is an internal thread which is adapted to threadingly enage with the external thread of a standard valve core as currently widely employed in the tire valve industry, and which allows for the ready insertion, removal and replacement of the valve core. At that end of the valve stem there may also be provided an external thread which is adapted to engage the internal threads of a tire valve closure cap of standard construction.

Accordingly, it is a primary object of the present invention to provide a tubeless tire valve assembly which is of a non-metallic construction.

It is a more specific object of the present invention to provide a tire valve assembly of the type described, which consists of basically two non-metallic components, in effect, a plastic valve stem and an encompassing rubber grommet adhesively bonded to the valve stem, which is adapted to receive a standard valve core, and which may be sealingly mounted in an aperture formed in a tire rim for a tubeless tire.

BRIEF DESCRIPTION OF THE DRAWINGS

Reference may now be had to the following detailed description of exemplary embodiments of a non-metallic tubeless tire valve assembly which is constructed pursuant to the present invention, taken in conjunction with the accompanying drawings; in which:

FIG. 3 is a transverse sectional view through the tubeless tire valve assembly taken along line 3—3 in FIG. 1; and FIG. 4 is a longitudinal sectional view through a modified embodiment of the tubeless tire valve assembly.

DETAILED DESCRIPTION

Figures 1, 2:
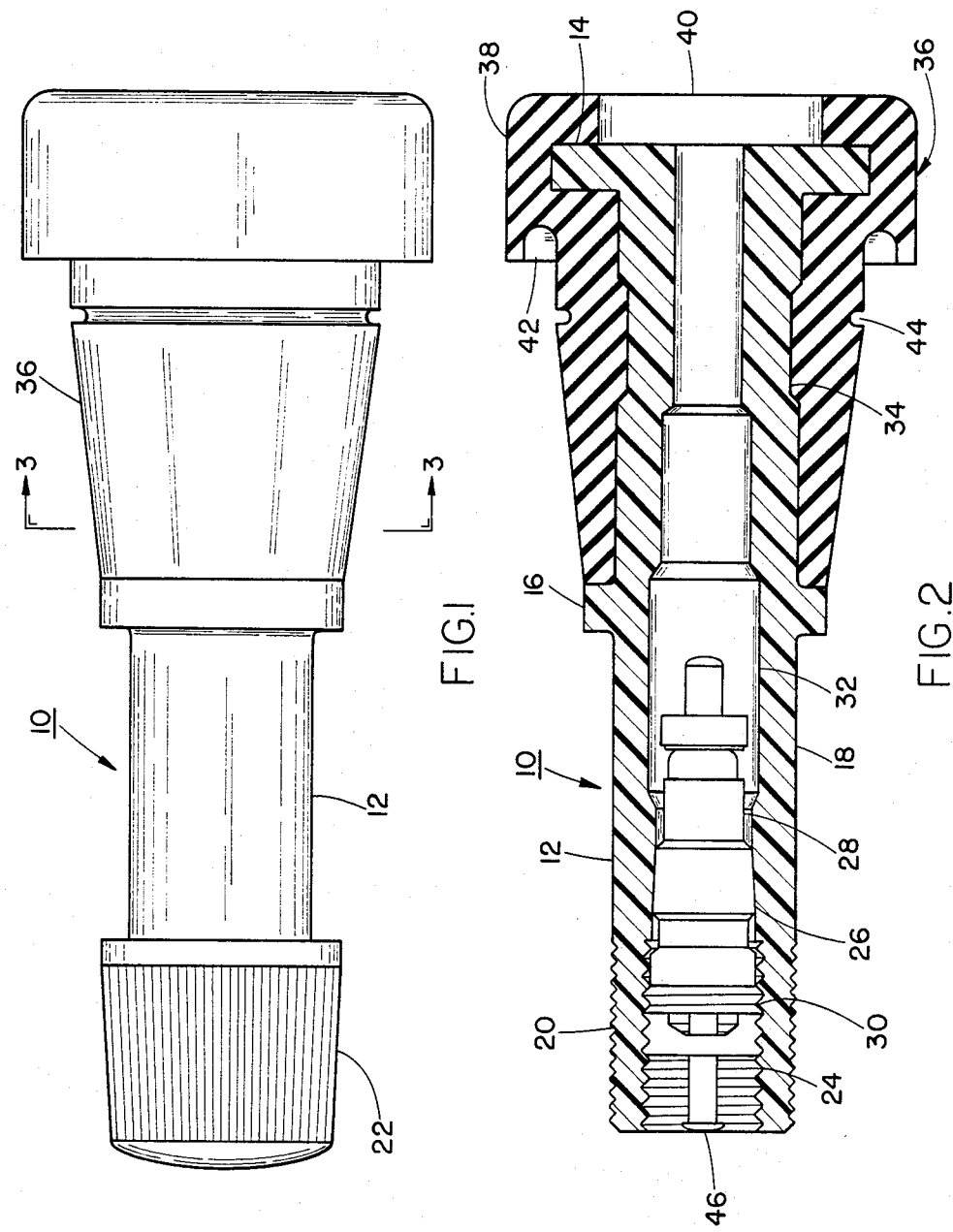
FIG. 1 illustrates a longitudinal view of a first embodiment of the tubeless tire valve assembly constructed pursuant to the invention.
FIG. 2 illustrates a longitudinal sectional view through the tubeless tire valve assembly of FIG. 1.

Referring now in particular to FIGS. 1 to 3 of the drawings, the tire valve assembly 10 pursuant to the invention, which is particularly adapted for use with tubeless tires, includes a valve stem 12 which is constituted of a suitable rigid plastic material, such as nylon, and preferably glass fiber-reinforced nylon. The valve stem 12 consists of an elongate, generally cylindrical member 18 having a first annular flange 14 at one end and a second annular flange 16 generally centrally intermediate the ends integrally formed with the cylindrical member 18. The end of the valve stem 12 opposite the end containing flange 14 includes an externally threaded portion 20 which is adapted to mount an internally threaded valve closure cap 22 of usual construction (not shown). The end portion of the valve stem 12 which includes the external thread 20 is also provided with an internal thread 24 terminating at a slightly inwardly tapering bore section 26. A standard tire valve core 28 is adapted to be threaded into the valve stem 12 to a predetermined inserted depth through the intermediary of an externally threaded end portion 30 on the valve core threadingly engaging the internal thread 24 of the valve stem 12. The interior of the valve stem 12 includes a central through bore 32 which is provided, if desired, with reduced diameter bore sections extending towards the flanged valve stem end 14. Intermediate the flanges 14 and 16 the outer circumference of the valve stem 12 may also be provided with a reduced diameter cylindrical section 34.

Molded about the cylindrical portion of the valve stem 12 and extending between flanges 14 and 16 is a grommet 36, formed preferably of rubber, which is firmly bonded or adhered to the exterior surfaces of the valve stem 12 and flange 14 along all surfaces contacting therewith so as to provide an integrally bonded structure therewith.

The rubber grommet 36 includes an enlarged diameter end portion 38 which encompasses the outer annular flange 14, while being provided with a central opening 40 in communication with the bore 32 so as to allow for the throughflow of air through the valve assembly 10 into and out of a tire (not shown) upon actuation of the valve core 28.

The outer contour of the rubber grommet 36 encompassing the valve stem 12 intermediate flanges 14 and 16 has a reducing taper towards the flange 16 and includes an annular recess 42 in the portion 38 and a recess 44 which are adapted to contact a tire rim in sealing relationship when the valve stem is mounted in a suitable aperture in the tire rim (not shown).

Although the rubber grommet 36 is adhesively bonded to the valve stem 12, in order to still further enhance bonding to the stem, the rubber grommet 36 is molded along its interior circumference so that material will extend into the annular reduced diameter portion 34 on the cylindrical stem 12.

The valve core 28 may be actuated in a manner well known in the tire valve art by actuation of the valve plunger 46 constituting a part of the valve core 28.

The embodiment of the tubeless tire valve assembly 50 illustrated in FIG. 4 of the drawings, in which similar or identical components of the tubeless tire valve assembly are provided with the same reference numerals as in the embodiment of FIGS. 1 to 3, primarily distinguishes from the preceding embodiment in that the intermediate flange 16 on the valve stem 12 has been eliminated, and wherein the rubber grommet 36 has an end portion 52 terminating somewhat centrally along the length of the cylindrical portion 18 of the valve stem 12.

From the foregoing it clearly appears that the tubeless tire valve assembly pursuant to the present invention has an uncomplicated non-metallic, two-piece construction; in essence, consisting of a nylon valve stem 12 and a rubber grommet 36 which, together with a standard replaceable valve core 28 and standard valve closure cap 22, presents an extremely simple and inexpensive tire valve arrangement.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A tubeless tire valve assembly for mounting within an aperture in a tire rim for a tubeless tire, said valve assembly comprising an elongated generally cylindrical valve stem of rigid material having a first substantially radial annular flange portion proximate one end defined by a pair of annular surfaces lying in substantially parallel spaced planes disposed substantially perpendicular to the longitudinal axes of said valve stem, said valve stem having a reduced diameter outer surface portion said first flange portion, said valve stem further defining an internal thread proximate the end thereof opposite said one end for threadingly receiving a valve core having a mating external thread, and a generally tubular rubber body molded about said valve stem and said first flange portion so as to be adhered to said pair of said annular flange surfaces and at least a portion of the length of said valve stem extending from said flange portion toward said opposite end and including said reduced diameter outer surface portion, said rubber body being operative to trap said valve stem within said rubber body and having at least one exterior annular recess formed therein intermediate said first annular flange portion of said valve stem and said opposite end thereof, said annular recess being adapted for sealing contact with the surface of a tire rim with said first annular flange disposed on the internal side of the tire rim, said first annular flange having a diameter approximately equal to the diameter of the portion of said rubber body received through the tire rim aperture so as to substantially prevent the tubeless tire valve from being blown out of the rim aperture.

2. A valve assembly as defined in claim 1 wherein said valve stem has a second annular flange portion formed on the outer circumference of said valve stem generally centrally along the length of said valve stem, said tubular rubber body extending about said valve stem intermediate said first and second flange portions.

3. A valve assembly as defined in claim 1 wherein said elongated valve stem is formed of nylon.

4. A valve assembly as defined in claim 1 wherein said elongate valve stem is molded from a fiber-reinforced plastic material.

5. A valve assembly as defined in claim 4 wherein said reinforced plastic material comprises glass fiber-reinforced nylon.

6. A valve assembly as defined in claim 1 wherein said valve stem has an internal reduced diameter bore portion at the inward end of said internal thread in said stem of limiting the extend of insertion of a valve core into said valve stem.

7. A valve assembly as defined in claim 6 wherein said internal reduced diamter bore portion is defined by a conically reducing wall bore section.

* * * * *

UNITED STATES PATENT AND TRADEMARK OFFICE
CERTIFICATE OF CORRECTION

PATENT NO. : 4,538,658

DATED : September 3, 1985

INVENTOR(S) : John R. Earley

It is certified that error appears in the above-identified patent and that said Letters Patent is hereby corrected as shown below:

Column 4, line 62, after "portion" insert --proximate--
Column 6, line 15, the word "extend" should be --extent--

Signed and Sealed this

Seventh Day of January 1986

[SEAL]

Attest:

Attesting Officer

DONALD J. QUIGG

Commissioner of Patents and Trademarks